Sept. 5, 1967  P. E. DAVIS, JR  3,339,897
CONTINUOUS MIXING DEVICE FOR DRILLING FLUIDS
Filed May 28, 1965  2 Sheets-Sheet 1
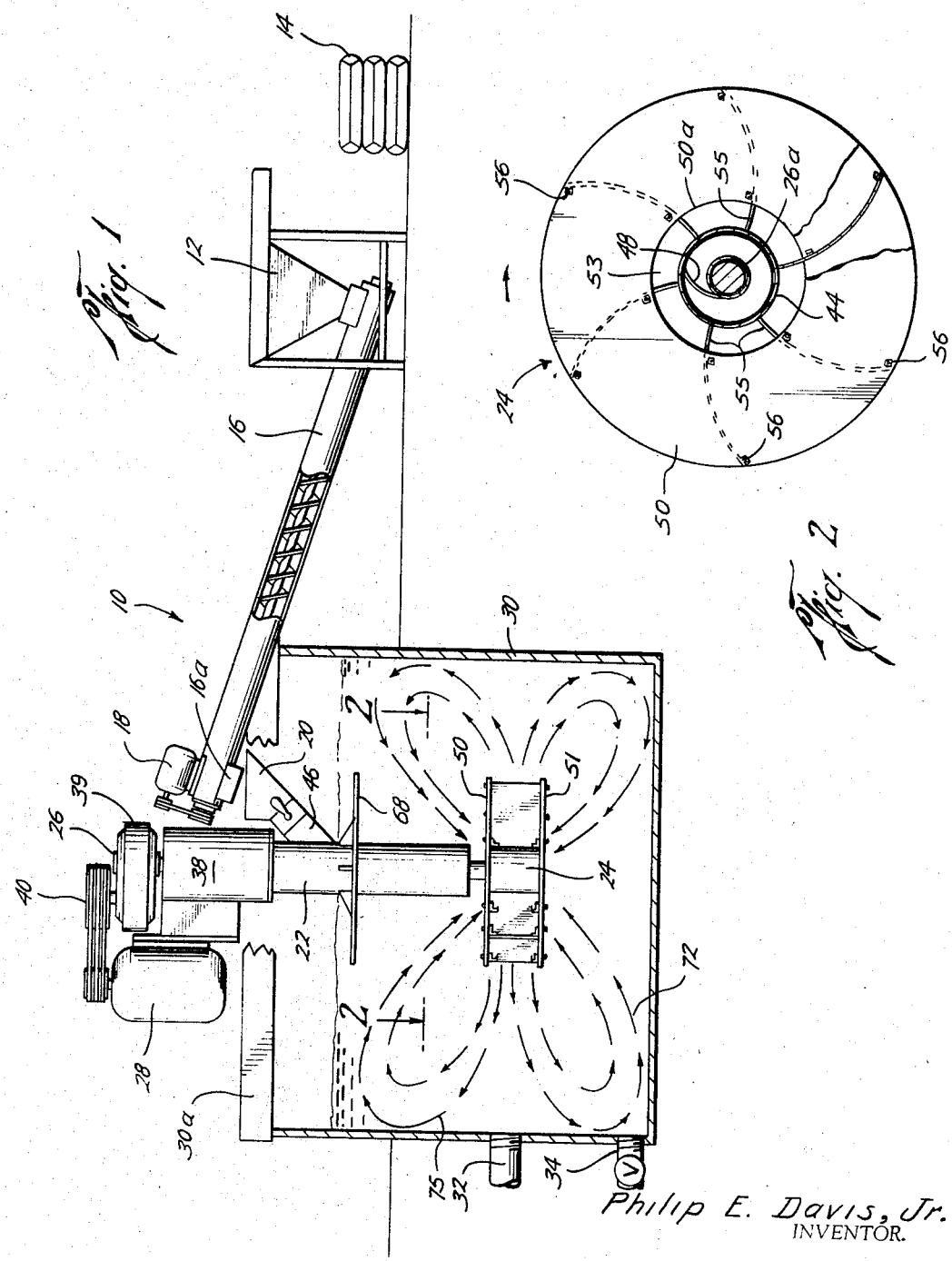
Philip E. Davis, Jr.
INVENTOR.
BY Hayden & Pravel
ATTORNEYS

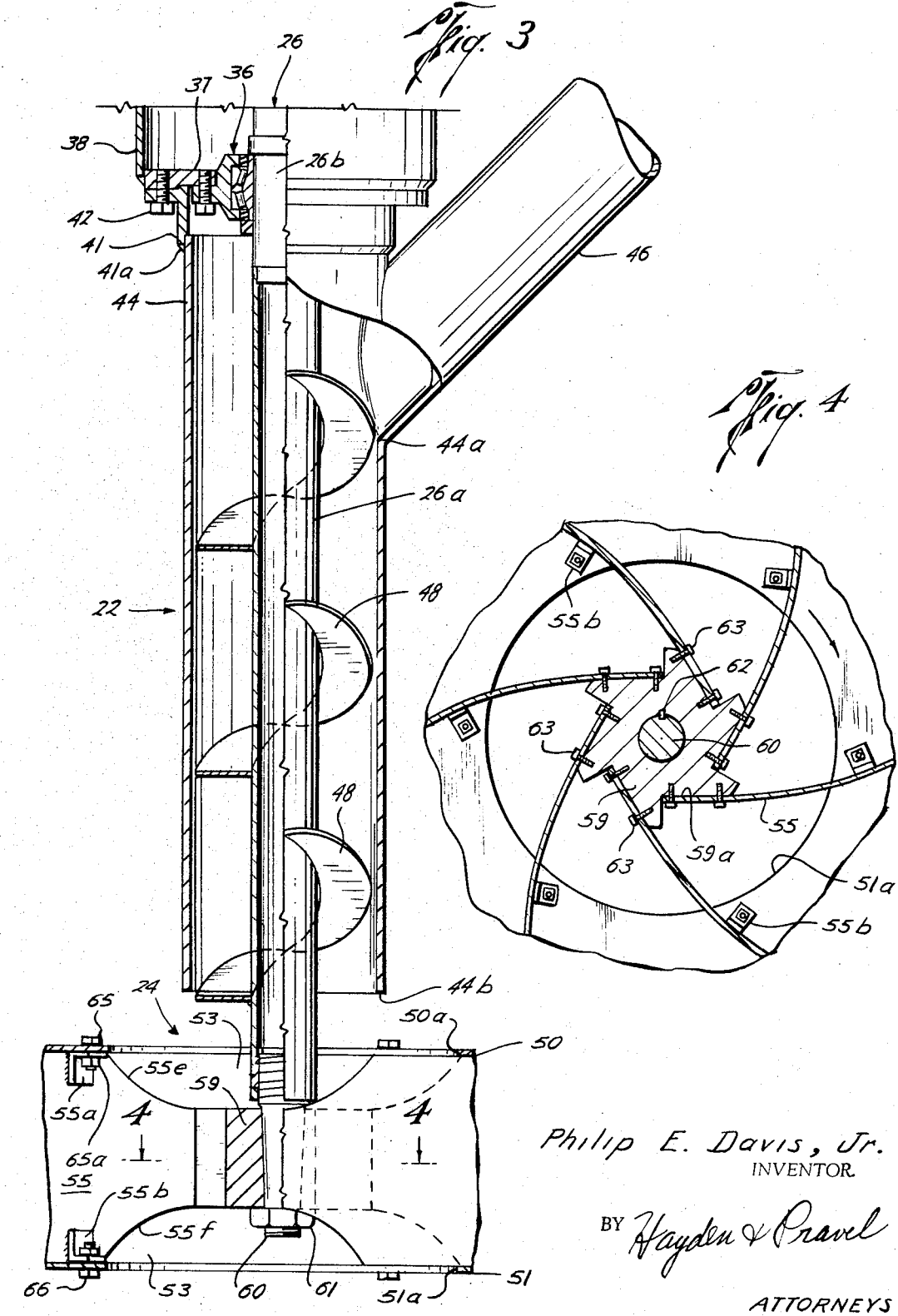

United States Patent Office 3,339,897
Patented Sept. 5, 1967

3,339,897
CONTINUOUS MIXING DEVICE FOR DRILLING FLUIDS
Philip E. Davis, Jr., 1423 Maury,
Houston, Tex. 77026
Filed May 28, 1965, Ser. No. 459,666
2 Claims. (Cl. 259—96)

This invention relates to a mixing device which folds in continually added wet and dry ingredients to provide an output flow of mixture, and more particularly relates to a mixing device for drilling fluids having means for uniquely inputting dry ingredients which creates a scavenging turbulence within the mixer to mix the ingredients uniformly. The impeller means is constructed and arranged to agitate the mixture to consistence even when a layer of heavy material is settled in the mixer without requiring excessive torque.

Drilling fluids or so-called "muds" are used in drilling oil and gas wells. The muds are mixed at the drilling site with various types of additives and gels added to the mixture in accordance with special needs of the well.

Drilling operations extended over a period of time require a continued addition of drilling mud to the well. Wet and dry ingredients are added to a mixture during agitation for thorough mixing while a continuous output of mud is simultaneously taken from the mixture for use in the well. While the circumstances of continued consumption of mud requires extended operation of a mixing device, occasionally, drilling operations will be interrupted and the mixing apparatus will be switched off. When the mixture is allowed to sit, heavier ingredients in the mixture tend to settle to the bottom of the container and form a heavy sediment in the container and gels and additives in the mixture may partially solidify, thus making restarting all the more difficult.

When a sediment is allowed to precipitate to the bottom of a container, problems may be encountered in remixing the partially separated gels and additives with the lighter ingredients rising to the top of the mixture. Moreover, even if it is possible to remix the separated layers after they have "set up," large starting torques are required to begin the mixing agitation, with various problems arising from the large torques.

The problems of starting a mixing device at drill site locations ranging from offshore tidal flats and in the swamps of Louisiana to the high plains of the western states remote from sources of electrical power place heavy power requirements on the power source. As a matter of fact, remote drilling sites have only semiportable generating equipment which must also provide sufficient electrical power for illumination and other operations occurring in and around the drilling site. It may be appreciated that such small electrical generators do not have the capabilities of an infinite bus and are unable to supply large current surges which commonly characterize the starting of electrical motors. Mixing devices to which this invention relates provided for blending dry and wet ingredients to make drilling muds commonly draw a large surge of starting current for which precautions are taken to avoid starting under heavy torque loads as is the situation when the mixing operation is interrupted and a sediment is allowed to form in and about the agitating means.

Of course, it is not desirable to mix air bubbles into drilling fluids in the agitation of the mixture so that the manner of adding the dry and wet ingredients and the extent of turbulence becomes important.

In view of these problems and others, devices to which the present invention relates have been found wanting, both in terms of mixing ability and in terms of the power drain placed on the remote generating systems (by large starting currents). Therefore, it is an object of the present invention to provide a new and improved mixing device yielding a continuous output mixture from dry and wet ingredients which, on restart, requires minimum torque to agitate sediment collected in the mixing device.

Another object of this invention is to provide a new and improved mixing device which creates a scavenging turbulence within the mixing container.

Another object of this invention is to provide a new and improved mixer for dry and wet ingredients which receives the dry ingredients into the impeller means and disperses same intimately within the mixture and thereby avoids unmixed lumps of dry ingredients within the mixture.

An additional object of this invention is to provide a new and improved mixing device which receives the wet ingredients of the mixture and draws same into the mixing container through inlet means that dispenses the wet ingredients to both the top and the bottom of the mixture in the container to comingle with such widely separated layers as a means of further achieving consistency of the mix.

A further object of this invention is to provide a new and improved mixer which draws the top layer of materials downwardly into the impeller means without forming a vortex in the mixture or folding bubbles of air into solution in the mixture.

Still another object of this invention is to provide a new and improved impeller means for use in a mixer container which is easily started even when immersed in a mixture allowed to set for a period sufficient to form a sediment in the mixer container where such impeller means is started from an initially stopped condition without requiring large starting current surges for the motor driving same to overcome large starting toques. This is of particular benefit in mixing drilling muds at remote drilling sites which have small, portable generating plants which are unable to supply large current surges.

Another object related to the above-mentioned object is the avoidance of large surges of starting current when the new and improved impeller means of this invention is started when immersed in a solution cooled to subfreezing temperature.

One object of this invention is to provide a new and improved impeller means which imparts a positive displacement to a mixture for creating turbulence.

A main object of this invention is to provide a new and improved mixer for drilling fluids or muds which does not overload the impeller means in the sediment on the bottom of the mixer container to cause starting difficulties overcome only by supplying very high torque to the impeller means. The device of this invention is therefore permitted to operate from a straight drive train of low torque capabilities without gearshift mechanisms or the like.

A timely object of this invention is to provide a new and improved impeller means which mixes thixotropic muds by positively displacing the mud.

An additional object of this invention is to provide a new and improved turbine-type, impeller means having axial intake openings for feeding the ingredients to be mixed into the impeller means which urges the mixture into a pair of counterrotating turbulences while simultaneously rotating the mixture as a whole about the impeller means to draw mixture from every point of the mixing container to fully and completely agitate all portions of the mixture to provide a consistent mix.

Yet a further object of this invention is to provide a new and improved mixer for wet and dry ingredients which meters the dry ingredients into the mixed batch within the container by means of metering apparatus operating coaxially with impeller means for mixing the dry ingredients into the mixture.

Another benefit of the present invention is the provision of a continuous output of mixture free of air and bubbles resulting from the avoidance of surface turbulence and the creation of a vortex in the agitated mixture.

Other objects and advantages of the present invention will become more readily apparent from consideration of the following description and drawings wherein:

FIG. 1 is a side, elevational view, partly broken away, of the mixing device of this invention which relates input means for dry and wet ingredients to the agitation of the mixture within the mixing container;

FIG. 2 is a sectional view taken along the line 2—2 of FIG. 1 which illustrates the upper surface of the impeller means of this invention which upper surface is partially broken away to disclose blades carried on the impeller means;

FIG. 3 is a sectional view taken of drive means for the impeller, coaxially extending intake means for dry ingredients, and the impeller; and FIG. 4 is a sectional view taken along the line 4—4 of FIG. 3 which illustrates details of the impeller of this invention.

Considering the invention in detail, the continuous mixing device for wet and dry ingredients is indicated generally at 10 in FIG. 1. The structure shown in FIG. 1 includes a hopper 12 which is adapted to be rested on a surface such as the ground adjacent the mixing device of this invention. The hopper means is believed well known to those familiar with the art. A plurality of bags indicated at 14 is one means of making available dry ingredients to be placed in the hopper 12. The hopper 12 is open at the top and includes a funnel-shaped, storage compartment which feeds dry ingredients to the lower end of a screw conveyor 16 with a portion of the sleeve broken away to illustrate the flights of the conveyor which are mounted on an axially extending shaft running the length of the screw conveyor 16. Rotation of the screw conveyor 16 is achieved by an electric motor 18 which is connected to the shaft by a belt drive as will be understood by those skilled in the art.

The upper end of the dry ingredient transfer means 16 includes an opening on its lower side which is further defined by a guide 16a attached to the conveyor 16 for metering the dry ingredients from the hopper means into a valve chamber 20 having a portion connected at an angle with cylindrical intake means 22 for supplying dry ingredients to the mixing device. The means 22 is centered on a drive shaft 26 which extends axially thereof for driving a turbine 24 connected to the lower end of the drive shaft for mixing the ingredients. The drive shaft 26 is rotated by motive means such as an electric motor 28 connected by a belt drive at its upper end to appropriate speed reduction means which will be described.

The turbine 24 is placed in the mixture to be agitated to a desired consistency contained in a container 30 which is preferably a large cylindrical structure having a rather large capacity. The container 30 is provided with an opening connecting to a pipe 32 which serves as inlet means for wet ingredients admitted to the container 30 and comingled with the mixture by operation of the turbine 24. In addition, an outlet means 34 includes a pipe and a valve for controlling the rate of flow through the pipe connected to the container 30.

The mixing device of this invention includes the structure shown in greater detail in FIG. 3 which is a view, partially in section, for relating the turbine 24 to the means for supplying dry ingredients to the mixture. Specifically, FIG. 3 illustrates the drive shaft 26 as preferably including a hollow member 26a which is threaded to an end plug 26b seated in suitable bearings indicated at 36. The bearing means 36 is bolted to a circular plate 37 which is fitted within the lower end of a cylindrical housing 38 extending axially of the drive shaft 26. Referring again to FIG. 1, it may be appreciated that the housing 38 is sufficiently long to accommodate two or more friction reducing means such as the bearings 36 which are preferably located at the upper and lower ends of the cylindrical housing 38. The cylindrical housing 38 aligns the drive shaft 26 with the center line of the container 30 at a desired point above its bottom and supports a gear reduction box 39 at the upper end of the shaft 26.

As will be appreciated by those skilled in the art, the speed reduction box 39 may include two, three, or more gears for providing a predetermined ratio between the speed of rotation of the drive shaft 26 and the speed provided at the driven pulley 40 of the belt drive mechanism communicating with the motor 28.

Returning again to FIG. 3, the circular mounting plate 37 provided in the cylindrical housing 38 is additionally joined to a downwardly opening sub 41 which is joined to the plate 37 by suitable means such as the bolt 42. The sub 41 is centered with respect to the drive shaft 26 and is adapted to receive sleeve means 44 which is extended concentrically of drive shaft 26. Sleeve means 44 is preferably connected to the sub 41 by the weld 41a, or other means. The sleeve 44 is a cylindrical member concentrically enclosing the drive shaft save for the opening 44a. Opening 44a is provided to connect with the valve chamber 20 by means of an angularly extending conduit 46. The conduit 46 is communicated with the valve structure 20 shown in FIG. 1 and opens into the means 22 for admitting dry ingredients thereto. Specifically, the means 20 includes a valve interposed between the dry ingredient outlet 16a carried on the conveyor 16 and the means 22 whereby flow through the conduit 46 is controlled. Ingredients are dropped from the screw conveyor 16 and flow by gravity through the conduit 46 and drop into the sleeve 44.

Sleeve means 44 encloses the flights of a screw conveyor 48 which helically extends along the length of the hollow member 26a within the sleeve 44. The flights of the conveyor 48 co-operate with the sleeve 44 to receive and transfer dry ingredients from the conduit 46 along the full length of the sleeve means 44 to its open end 44b shown near the bottom of FIG. 3. It may be appreciated that the conveyor advances the dry ingredients through the sleeve means 44 which opens toward the mixing turbine 24 but is spaced some distance therefrom.

Attention is directed to FIG. 2 which illustrates the upper side of the turbine 24. The turbine 24 is fabricated of a plurality of blades 55 which extend nonradially of the turbine 24 between a pair of plates 50 and 51. The upper plate 50 shown in FIG. 2 defines axially located intake means at 53 which is preferably duplicated centrally of the lower plate 51, as shown in FIG. 3. The turbine blades 55 extend outwardly of the turbine 24 and are utilized to positively displace the mixture in the container 30 as will be described in greater detail hereinafter. Dry ingredients are supplied through the sleeve 44 shown in FIG. 2 in response to urging of the conveyor 48 which is carried on and rotated by the shaft 26. In addition, FIG. 2 illustrates several mounting bolts 56 which connect the turbine blades 55 to the upper and lower plates 50 and 51, respectively.

Referring again to FIG. 3, the turbine means 24 is illustrated as including a centrally located hub 59 which is engaged with a threaded member 60. The member 60 is threaded into the shaft 26 at its lower end and is bolted to the hub 59 by a nut 61 engaged with threads on the lower end of the member 60. The hub 59 provides a connection for the blades 55 whereby the turbine 24 is constructed and arranged to positively displace the mixture in the container 30 outwardly with agitation to accomplish mixing in the desired manner.

Additional details of the hub 59 are illustrated in FIG. 4 which shows that the hub 59 is secured to the plug 60 by a key 62. The hub 59 is preferably a solid member having a plurality of flats 59a extending at the indicated angles with respect to the axis of the hub to provide a seat for the blade means 55. Specifically, the flats 59a receive the inwardly located tips of the blades 55 which are anchored or connected to the hub 59 by bolts or adequate means. While the hub 59 anchors and supports the inwardly-located ends of the blades 55, the blades are also connected at their outer ends and mid-points by connection to the upper and lower plates 50 and 51, respectively, to further fix the blades in position relative to the turbine 24. Referring again to FIG. 3, the blade 55 includes a welded tab 55a near its upper edge which provides a projection extending beneath a bolt hole in the upper plate 50 through which a bolt 65 is placed and engaged with a nut 65a. In addition, a tab 55b is secured near the lower edge of the blade 55 to provide a similiar, extending tab for connection with a bolt 66 which is threaded through the lower plate 51. The bolts 65 and 66 support the blades 55 somewhat near the mid-point of the blades.

It may be appreciated that the bolts 56 shown in FIG. 2 near the outer periphery of the upper plate 50 are engaged with similar or identical mounting tabs carried near the tips of the blades 55 to fix the blades 55 in position relative to the turbine 24. As mentioned before, the blades of the turbine 24 extend outwardly nonradially to position the outer tips outwardly of and behind the tips of the blades 55 connected to the hub 59 such that the inwardly located tips are provided with leading edges during rotation.

The leading edge of each of the blades 55 includes two curved surfaces shown at 55e and 55f in FIG. 3. The upper plate 50 includes the axially located intake means 53 for drawing mixture through an opening 50a into the interior of the turbine 24. In addition, the lower plate 51 includes a similar axially located opening 51a for drawing additional mixture into the turbine 24. It may be appreciated that during operation, the turbine 24 positively displaces mixture in the container 30 radially outwardly of the turbine 24 and draws additional mixture into the turbine through the openings 50a and 51a. The additional mixture is not acted on by the turbine until engaged by the blades 55 wherein the curved surfaces 55e and 55f, so to speak, take a bite of mixture into the turbine proper to push the mixture outwardly of the turbine and back into the container 30 as will be described in greater detail hereinafter.

Attention is directed to FIG. 1 which illustrates the above-described turbine 24 suspended in the container 30. The drive shaft 26 is held in position relative to the mounting sleeve 38 which is joined to a roof 30a placed over the container 30. The drive shaft 26 extends into the container and positions the turbine 24 nearer the bottom of the container 30 than the top of the mixture in the container and in position to substantially stir and rotate all of the mixture in the container. It may be appreciated that rotation of substantially all the material in the container 30 accomplishes mixing as will be described in greater detail hereinafter. A possibility exists that the mixture which rotates in the container 30, which is constructed and arranged to cause rotation of substantially all the material, might form a vortex or cavitation at the center of the material. This depends in great part on the viscosity of the material and also on the speed of rotation of the turbine 24. When a vortex is formed, the whirlpool may be suppressed by the anticavitation means having the preferred form of a plate 68 which is attached to the tubular sleeve 22 and preferably located somewhat below the surface of the mixture in the container 30. Prevention of a vortex materially aids the mixing action of the turbine 24 and avoids folding air bubbles into the mixture.

In operation, the mixing device 10 of this invention is used to mix wet and dry ingredients continuously provided thereto and is capable of delivering a continuous output through the outlet means 34. Since the mixing device 10 can be operated under various circumstances, description of operation with the container 30 initially empty will be first described. When the mixing device 10 is started with the container 30 initially empty, dry and wet ingredients are added to the container 30 at a rate depending on the desired ratio of ingredients. The outlet means 34 is closed while liquid ingredients are added through the inlet means 32 and dry ingredients are added to the hopper means 12. The dry ingredients are removed from the hopper means 12 by the metering transfer means 16 in response to operation of the motor 18. The dry ingredients are transferred from the conveyor 16 to the valve chamber 20 and connective means 46 for delivering the dry ingredients to the input means 22 and thence to the turbine 24.

The motor 28 rotates the drive shaft 26 and the flights of the conveyor 48 which move past the opening 44a with rotation being such as to transfer the dry ingredients downwardly of the sleeve means 22 towards the turbine 24. The dry ingredients are transferred from the lower end of the sleeve means 22 which extends toward and opens adjacent the turbine and into the turbine 24 through the axially located intake means 53. As continued filling of the container achieves a level sufficient to bring the mixture into the turbine 24, the turbine 24 begins to carry all the mixture in rotation about an axis coinciding with the drive shaft 26. Rotation about the drive shaft 26 is achieved in addition to the formation of a turbulence approximately indicated by the arrows 72 in the mixture below the level of the turbine 24. The thixotropic mixture is pumped by positive displacement from within the turbine 24 and forms the turbulence centered concentrically about the turbine 24 wherein the mixture departs from the outer periphery of the turbine 24 and is drawn in through the lower opening 51a in the turbine 24 for continuation of the cycle. Simultaneous with this, of course, addition of dry and wet ingredients is continued to the interior of the container 30.

When the mixture level reaches that illustrated in FIG. 1, an additional turbulence concentric about the turbine 24 is created. Specifically, the second turbulence which is indicated by the arrows 75 counterrotates the material in the container 30 compared with the turbulence 72 shown in FIG. 1 in the approximate lower half of mixture in the container 30. It may be appreciated that the counterrotating turbulences indicated by the plurality of arrows 72 and 75 simultaneously mix the mixture in the container 30 and also carry the mixture past the inlet means 32 to homogeneously add or mix the liquid ingredients admitted through inlet means 32 to all portions of mixture in the container 30, including the layers at the top and the bottom of the container. It may be further appreciated that the counterrotating turbulences 72 and 75 aid in drawing the uppermost layer of mixture in the container 30 into the turbine 24 as well as the layer of mixture on the bottom of the container 72. Also, the scavenging effect of drawing in mixture from the bottom maintains consistency of the mixture and prevents the formation of a heavy layer of material at the bottom and a light layer of material at the top of the container 30. As shown in the drawings, mixture is drawn from the furthest point of the container 30 toward the turbine 24. But, in addition to the flow represented by the arrows, rotation of the entire mass which is carried along with the turbine 24 centrifugally urges mixture near the center radially outwardly of the container 30 and into the turbulent streams which are directed towards the axially located intake means of the turbine 24.

On reaching the level in the container 30 indicated in FIG. 1, the input of wet and dry ingredients may be continued indefinitely simultaneously with the removal of mixed, homogeneous mixture through the outlet means 34. It may be appreciated that the mixture removed through the outlet means is completely and homogeneously mixed and is without lumps, air bubbles or variations in viscosity.

While the foregoing described operation of the device on filling the container 30 from the completely empty state to the level shown in FIG. 1, it may be appreciated that the mixing device 10 of this invention is adapted for use in other circumstances. For instance, the motor 28 may be interrupted during operation and the turbine 24 stopped within the container 30 for some interval of time during which the mixture in the container is allowed to settle. While it depends to a great extent on the nature of the ingredients in the mixture, it will be appreciated that solids in many mixtures tend to settle to the bottom of the container 30 to form a thick layer and the liquid ingredients in the mixture may tend to rise to the surface of the mixture in the container 30. It is possible for the turbine 24 to be engulfed in the heavy sediment at the bottom of the container 30, holding the turbine 24 to a greater or lesser extent. In these circumstances, it may be appreciated that the placement of the turbine 24 somewhat nearer the bottom of the container rather than the top layer of mixture in the container positions same for operation to remix the entire mixture in the container to the desired consistency so that the outlet means may thereafter be opened to remove homogeneous mixture from the container 30.

Electrical power is applied to the motor 28 to initiate rotation of the turbine 24 when the sediment is formed in the bottom of the container. Rotation of the turbine 24 in the mixture with a sediment on the bottom of the container 30 is uniquely initiated by the mixing device 10 of this invention to avoid current surges which overload the power source for the motor 28. This invention may be utilized at remote drilling sites where electrical power is obtained from a small portable generator. Such generators have limited capabilities and are not able to supply large current surges required routinely by electric motors when starting. However, when the mixing device 10 of this invention is connected to a portable electric generator, the current surge required by the motor 28 on starting is materially reduced without regard to the construction or type of winding in the motor 28.

Specifically, starting of the motor 28 beings rotation of the turbine 24. The turbine 24 on initiation of rotation is completely surrounded by mixture but it is unable to take a bite with the leading edges 55e and 55f of the blade. Moreover, the blades 55 extend nonradially of the turbine 24 to position the outer tips of the blades 55 rearwardly of the leading edges of the turbine blades so that positive displacement outwardly of mixture in the turbine 24 is reduced which therefore reduces the torque required to initiate rotation. The positive displacement outwardly of the turbine 24 is also dependent on the centrifugal force and therefore on the speed of the turbine 24. Initiation of operation from a halted position imparts no centrifugal force to the mixture and does not positively displace the mixture outward of the turbine. Because of these various factors, the turbine 24 carries the mixture in it along between the blades during the first few rotations but it does not draw mixture in through the axially located intake means 53 and does not urge mixture radially outwardly of the turbine 24.

After acceleration of the turbine 24, the turbine 24 then beings to pump or displace mixture radially outwardly of the blades 55 and beings the flow pattern in the mixture directed at the walls of the cylindrical container 30. The walls turn the flow pattern upwardly and downwardly as indicated by the arrows 72 and 75 in FIG. 1. In addition to the turning of the flow along the wall of the container 30 simultaneously therewith, the turbine 24 draws mixture through the axially located intake means which creates an additional turbulence in the container 30 directed towards such intake means. This turbulence is represented in FIG. 1 as the arrows immediately above and below the upper and lower plates 50 and 51 of the turbine 24 and results in counterrotating turbulences within the container 30 somewhat as indicated which provides a complete loop for travel. As mentioned hereinbefore, it may be appreciated that such turbulence carries mixture from the top and bottom layers in the container into the turbine.

Starting of the mixing operation with the turbine 24 submerged in mixture which may or may not have a sediment at the bottom of the container 30 is beneficial in other ways. For one, the current drawn by the motor 28 on starting is materially reduced without regard to the type of motor actually chosen. The starting current is particularly critical for the first fraction of a second when the motor is literally standing still and extends to the time at which the rotor actually rotates and is able to generate back electromotive force which reduces the current flow of the motor. Because the mixer 10 of this invention does not start under full load and does not agitate the mixture on starting and further because the blades 55 of the turbine 24 do not take a bite on initial rotation, low torque is required of the motor 28 which results in low starting current. Therefore, there is no need of gear shift mechanisms, auto transformers connected between the motor and current source, or other apparatus specially needed for starting the mixing device 10 of this invention. In addition, the transfer of low torque by the drive shaft 26 eliminates the need for a lower support and bearings for the shaft 26 and so alters the requirements for suspension and alignment of the shaft 26 at its upper end that the illustrated structure is found more than sufficient for the required torque.

Attention is directed to the dry ingredient inlet means which extends along the drive shaft 26 and which opens at a point adjacent to but spaced from the axial intake means on the turbine 24. It may be appreciated that the means of adding dry ingredients thoroughly disperses the dry ingredients into the mixture fully throughout the container 30 whereby the possibility of dry lumps of material in the mixture is avoided. The dry ingredients are drawn into the turbine 24 from the lower end of the sleeve means 22 and dispersed within the container 30 by the counterrotating turbulences 72 and 75 which extend fully throughout the container which is constructed and arranged so that all portions of mixture in the container are agitated and rotate about the drive shaft 26. The metering of dry ingredients to the mixture which is achieved by the regulated transfer of dry ingredients from the hopper means 12 through the transfer means 16, the connective means 20, and the dry ingredients inlet means which open into the container 30 regulates the addition of dry ingredients while mixing is achieved simultaneous with the removal of mixture through the outlet means 34.

The mixing device of this invention is particularly useful at remote drilling sites. As mentioned before, remote drilling sites quite often are limited to the use of small, limited, portable, power-generation rigs. The starting current required by the mixing device 10 of this invention does not require special precautions or equipment to initiate operation and to avoid overloading the limited power equipment. In addition, the device 10 of this invention provides a mixing means for stirring ingredients to make drilling muds and is able to stir to a desired consistency drilling muds even after a sediment is formed in the bottom of the container 30. Moreover, such sediment does not impede initiation of operation of the mixing device 10 of this invention.

Broadly, this invention relates to a mixing device having continuous output of mixture made from wet and dry ingredients added continuously and mixed to a thorough, homogeneous consistency. In addition, the device uniquely alters the load placed on the motive means to thereby reduce the required starting currents on initiation of operation when the mixing device is filled with a sediment near the bottom.

What is claimed is:
1. An agitator for agitating drilling fluids in a container comprising:
    (a) a drive shaft extending downwardly into the container;

(b) bearing support means adjacent the upper end of said shaft for supporting said shaft for rotation within said container;
(c) speed reducing means mounted on the upper end of said drive shaft;
(d) means connected therewith for imparting rotation to said speed reducing means and drive shaft;
(e) means mounted on the lower end of said shaft for immersion in the fluid in the container and agitating it when said shaft is rotated;
(f) said last named means including:
 (1) a hub mounted on the lower end of said shaft;
 (2) said hub having a plurality of flat surfaces on the outer edge thereof;
 (3) a plurality of blades each having end portions which are secured to said flats on said hub;
 (4) a pair of spaced, parallel, circular plates, with one plate secured to the upper edge of said blades and the other plate being secured to the lower edge of said blades to position said blades vertically therebetween and each blade being arcuate in form between said plates from their point of connection with said hub flats to the outer edge of said plates; and
 (5) said plates each having an opening centrally thereof and the spaces between said blades at the outer edge of said plates being open and unrestricted whereby drilling fluid may be pulled into the openings in the top and bottom plates and discharged through the open spaces between said blades at the outer edge of said plates.

2. An impeller arrangement for agitating drilling fluids in a container comprising:
(a) a drive shaft extending downwardly into the container;
(b) bearing support means adjacent the upper end of said shaft for supporting said shaft for rotation within said container;
(c) means mounted on the lower end of said shaft for immersion in the fluid in the container and agitating it when said shaft is rotated;
(d) said last named means including:
 (1) a hub mounted on the lower end of said shaft;
 (2) said hub having a plurality of flat surfaces on the outer edge thereof;
 (3) a plurality of blades each having end portions which are secured to said flats on said hub;
 (4) a pair of spaced, parallel, circular plates, with one plate secured to the upper edge of said blades and the other plate being secured to the lower edge of said blades to position said blades vertically therebetween and each blade being arcuate in form between said plates from their point of connection with said hub flats to the outer edge of said plates; and
 (5) said plates each having an opening centrally thereof and the spaces between said blades at the outer edge of said plates being open and unrestricted whereby drilling fluid may be pulled into the openings in the top and bottom plates and discharged through the open spaces between said blades at the outer edge of said plates.

References Cited

UNITED STATES PATENTS

| | | | |
|---|---|---|---|
| 2,226,470 | 12/1940 | McGuffee | 259—23 |
| 2,418,547 | 4/1947 | Cowles | 259—24 X |
| 2,577,010 | 12/1951 | French | 259—24 |
| 2,655,436 | 10/1953 | Bishop et al. | 259—96 X |
| 3,170,638 | 2/1965 | Burton | 259—96 X |

FOREIGN PATENTS

| | | |
|---|---|---|
| 562,921 | 7/1944 | Great Britain. |
| 643,470 | 9/1950 | Great Britain. |

WALTER A. SCHEEL, *Primary Examiner.*

J. M. BELL, *Examiner.*